Dec. 29, 1953  W. C. BROEKHUYSEN  2,664,483
THERMOSTAT
Filed Feb. 21, 1950  3 Sheets-Sheet 1
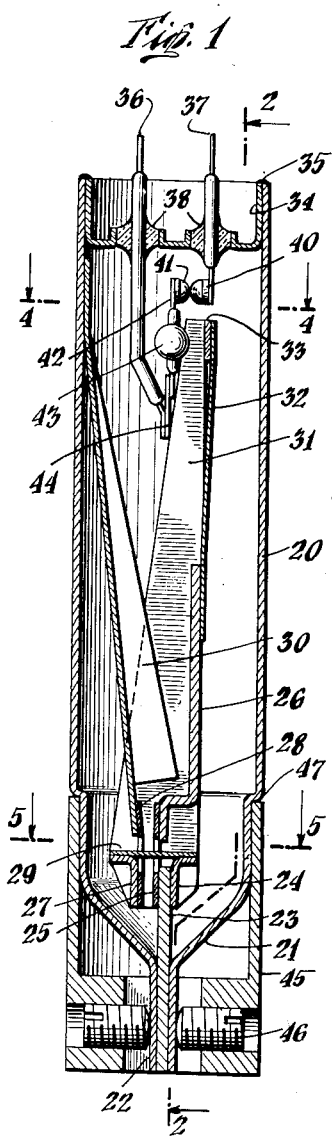
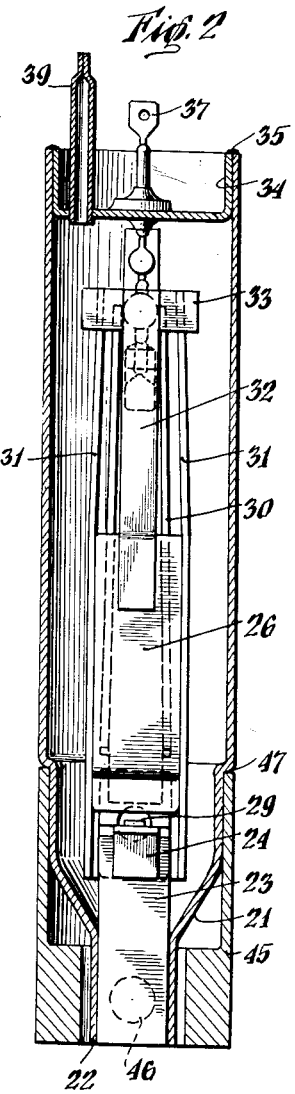
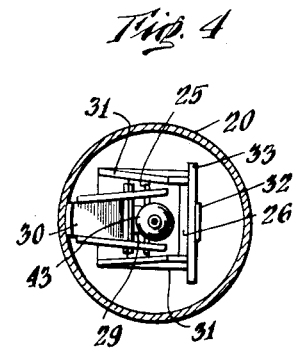
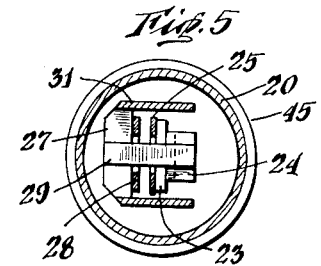
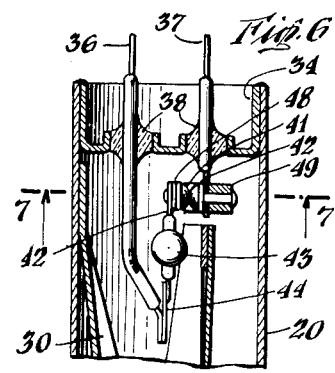
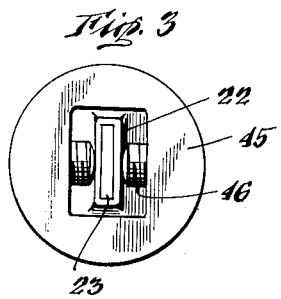
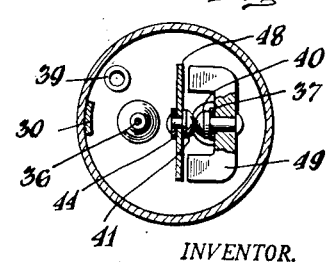
INVENTOR.
*William C. Broekhuysen*
BY
*Duell and Kane*
ATTORNEYS

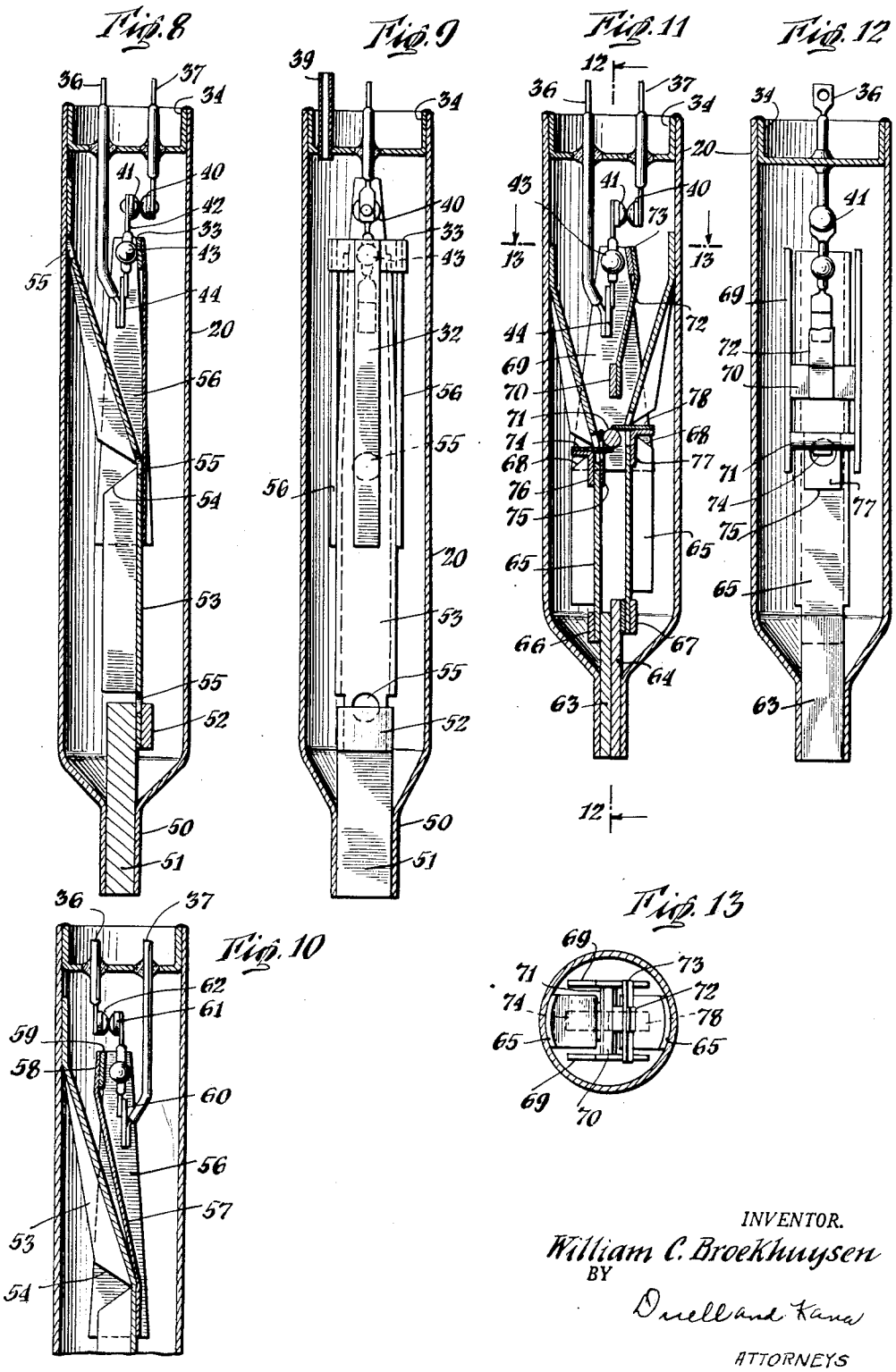

Dec. 29, 1953 W. C. BROEKHUYSEN 2,664,483
THERMOSTAT
Filed Feb. 21, 1950 3 Sheets-Sheet 3
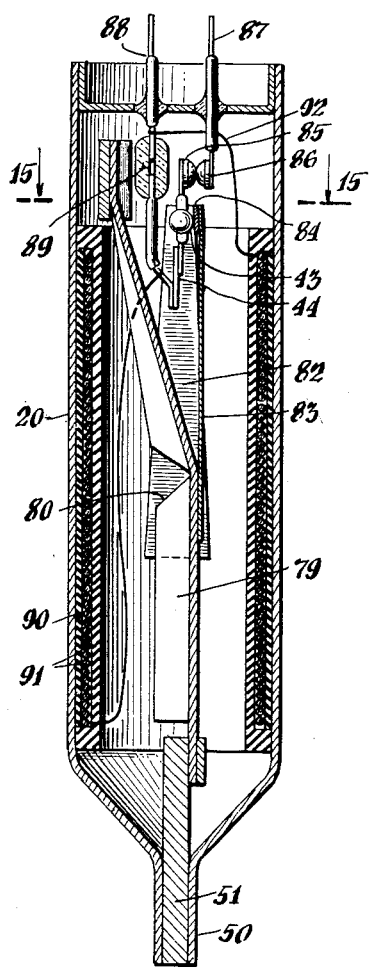
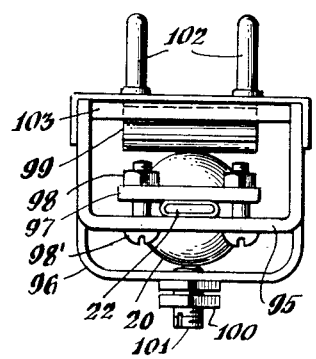
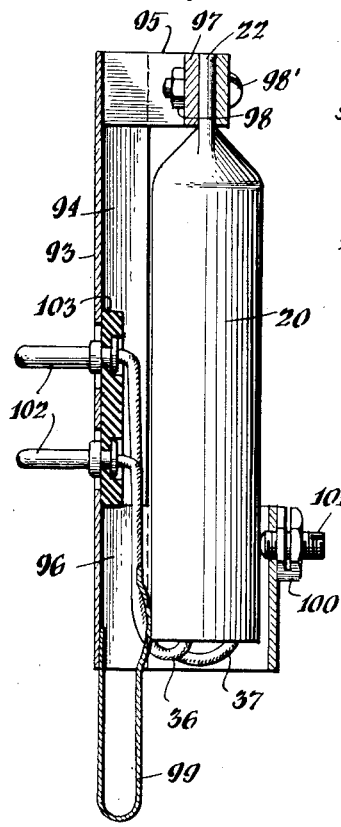
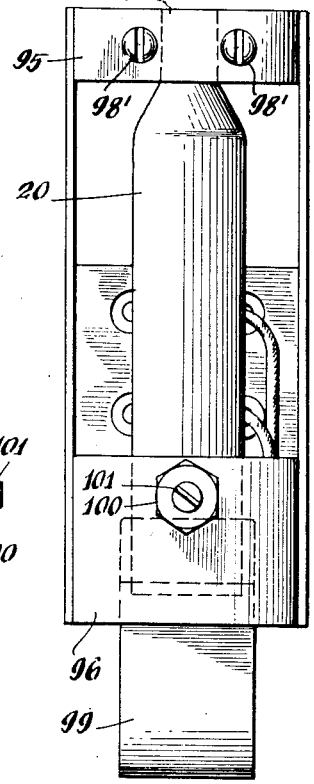
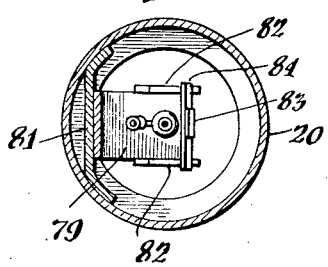
INVENTOR.
William C. Broekhuysen
BY
Duell and Kane
ATTORNEYS Patented Dec. 29, 1953

2,664,483

UNITED STATES PATENT OFFICE 2,664,483

THERMOSTAT

William C. Broekhuysen, Brooklyn, N. Y.

Application February 21, 1950, Serial No. 145,475

16 Claims. (Cl. 200—137)

This invention relates to a functionally and structurally improved thermostat for controlling the opening and closing of a desired circuit or circuits to in turn control mechanisms such as cooling and heating apparatus.

It is an object of the invention to provide a thermostat, the mechanism of which may be wholly enclosed so as to be maintained free from contact with dust and other material which would cause faulty operation; such thermostat responding with minimum lag to temperature changes.

A further object is that of providing an apparatus of this type which will operate perfectly even when installed at points where it is subjected to constant vibration and rapid and numerous variations in temperature; the assembly being capable of ready adjustment—when this is required—by manipulation of the exterior parts or surfaces and this adjustment not being critical.

Among other objects of the invention are those of providing a compact and relatively small unit, the parts of which will be free from friction or back lash so that a stable assembly is furnished. Moreover, the unit will include relatively few parts, each individually simple and rugged in construction, these parts being capable of manufacture by quantity production methods and assembly at minimum expense to furnish a thermostat or control having a long effective life free from all difficulties.

With these and other objects in mind, reference is had to the attached sheets of drawings illustrating practical embodiments of the invention and in which:

Fig. 1 is a sectional side view of a thermostat;

Fig. 2 is a longitudinal section taken along the lines 2—2 and in the direction of the arrows as indicated in Fig. 1;

Fig. 3 is a bottom plan view of the device;

Figs. 4 and 5 are transverse sectional views taken along the lines 4—4 and 5—5 respectively and in the direction of the arrows as indicated in Fig. 1;

Fig. 6 is a fragmentary view of the upper portion of an apparatus embodying alternative structure over that shown in the earlier figures;

Fig. 7 is a sectional view taken along the lines 7—7 and in the direction of the arrows as indicated in Fig. 6;

Figs. 8 and 9 are views similar to Figs. 1 and 2 but showing alternative forms of structure;

Fig. 10 is a fragmentary view showing in section the upper portion of the unit and illustrating a further arrangement of the parts;

Fig. 11 is a view similar to Fig. 1 but showing still another arrangement;

Fig. 12 is a sectional view taken along the lines 12—12 and in the direction of the arrows as indicated in Fig. 11;

Fig. 13 is a transverse sectional view taken along the lines 13—13 and in the direction of the arrows as also indicated in Fig. 11;

Fig. 14 is a sectional side view illustrating a heating element in association with the thermostat assembly;

Fig. 15 is a transverse section taken along the lines 15—15 and in the direction of the arrows as indicated in Fig. 14;

Fig. 16 is a sectional side view of an assembly illustrating one manner of mounting the thermostat;

Fig. 17 is a top plan view thereof; and

Fig. 18 is a front view of the assembly as shown in Fig. 16.

Referring primarily to Figs. 1 to 5 inclusive, the numeral 20 indicates a tubular casing preferably of brass and which in section may be circular in outline. The lower end of this casing is reduced as at 21 and terminates in a constricted neck portion 22. Filling the latter and extending into the casing is a strip 23. This strip serves as a mounting for certain of the parts as hereinafter described and is preferably formed of metal having a low co-efficient of expansion.

At its inner end strip 23 has secured to it a bracket 24 in contact with one of its faces. To its opposite face a spring 25 is secured. This spring may be approximately square and in turn mount a supporting member 26. Member 26 forms part of a rigid arm assembly which includes also spaced webs 31 and angle bracket 27. The connections between these parts may be conveniently effected by spot welding. The lower end of a spring 28 is secured to bracket 27. Springs 25 and 28 are formed with openings through which extends a spring strip 29. The latter is secured adjacent its opposite ends to brackets 24 and 27 respectively. A strut member 30 has its lower end secured to the upper end of spring 28; its upper end being secured against movement with respect to the inner face of tube 20 adjacent the upper end of the latter. All of these points of securing or attachment are conveniently achieved by spot welding.

Strut member 30 is formed of metal having a low co-efficient of expansion. The assembly provided by springs 25, 28 and 29 furnishes a flexion connection. Thus, strip 23 and the arm assembly provided by supporting member 26 and the parts carried thereby are pivotally connected as are also the arm assembly and strut 30. Tube 20 being formed of a metal, having a high co-efficient of expansion such as brass and strip 23 and strut 30 being secured to that tube and being formed of metals having a negligible co-efficient of expansion, it follows that the flexion coupling afore-described will transmit movement to the other parts of the assembly. This would occur as the body of tube 20 is subjected to either cooling or heating.

To supporting member 26 a spring 32 is secured by, for example, spot welding. This spring may have a width less than the distance between webs 31. It carries at its upper end a transverse bar 33, the face of which bears against the rear edges of webs 31. The connections between spring and bar may again be conveniently effected by spot welding. The upper end of tube 20 is closed by a cap 34 and air flow between the parts may be prevented by solder. Passing through the cap are leads or electrodes 36 and 37. To provide insulation and also to provide proper seals, bodies of glass 38 may be interposed between the leads 36 and 37 and the adjacent surfaces of the cap. This structure may be established by raising the temperature to the melting point of the glass. A boro-silicate glass may be employed which may have substantially the same co-efficient of expansion as the material of cap 34 and leads 36 and 37. Cap 34 may also be pierced by an evacuating gas or liquid charging tube 39.

Lead 37 supports at its inner end contact 40 with which a contact 41 cooperates. The latter is mounted upon the flattened outer end of a wire strip 42 to which is secured a body 43 of di-electric material. The diameter of this body is such that it may pass into the space existing between webs 31. Preferably body 43 is formed of glass which is bonded to the body of wire 42. The inner or lower end of that wire may also be flattened and secured to a spring 44 attached to the lower or inner end of electrode or lead 36. Spring 44 is biased so as to urge contact 41 in the direction of contact 40, to assure proper electrical engagement.

To support tube 20 the lower or flattened end of the latter as defined by neck portion 22 is disposed within a socket or cup 45. The base of this socket can be provided with opposed threaded bores within which plugs 46 are mounted. In that case tube 20 may be provided with a reduced or socket-entering portion defined by a flange 47 which will bear against the upper edge of cup 45. Under these circumstances and with the reduced portion of the tube bearing in supporting relationship against the inner face of cup 45 it is apparent that by retracting one of the plugs 46 and projecting the other of the same, the neck portion 22 of the tube and the strip carried thereby may be axially deflected. In other words it will be rocked around a pivot zone generally defined by the point of juncture of the reduced portion 21 and strip 23. If a cup or equivalent supporting portion is not employed, then the same pivoting action may be secured by bending or swinging neck portion 22 to the left or right as viewed in Fig. 1; this being achieved by the use of a pair of pliers or any other suitable tool.

As will be understood in operation with respect to the mechanisms as shown in Figs. 1 to 5, leads 36 and 37 will be connected to a source of current supply and with the unit to be controlled. That unit may embrace a refrigerating apparatus. Assuming the parts to be properly adjusted with respect to each other, then if the assembly is subjected to heat—as would be the case if warm air is passing in contact with the outer surface of tube 20—the latter will expand. Due to the low co-efficient of expansion inherent to strut 30 and strip 23 they will not respond by an axial lengthening of their assembly to any degree corresponding to the axial enlargement of tube 20. Consequently a pull will be exerted by strut 30 and strip 23 on the interposed flexion coupling. Due to the manner in which the webs 31 and supporting member 26 are connected to this coupling, that assembly will move in a clockwise direction as viewed in Fig. 1. Because spring 44 is urging contact 41 into circuit-closing position such movement of the parts will have no effect on the controlled circuit, which will remain closed.

If, however, the exterior of tube 20 is subjected to cooling action, then the axial length of that tube will shrink, but any shrinkage of strip 23 and strut 30 will not occur to a corresponding extent. Therefore, webs 31 or their equivalents will begin to shift in a counterclockwise direction as viewed in Fig. 1. Under continued movement bar 33 will engage di-electric body 43. Due to the fact that spring 32 has greater tension than spring 44, such engagement will result in the latter spring being flexed, causing a separation of contacts 40 and 41 and an opening of the circuit which they control. Further shifting will bring the globule 43 into contact with lead or electrode 36. If still further cooling of the parts occurs, then bar 33 will lift out of contact with the edges of webs 31 due to the provision of spring 32. Accordingly, dangerous stresses which might be set up by an over-cooling of the parts will be avoided and no damage will occur to the mechanism. Despite this safety provision it will be apparent that the closing and opening of the contact ordinarily occurs in a positive manner. This is because bar 33 in effect moves as a unit with webs 31 and supporting member 26 and, in contact with element 43, directly controls the engagement or separation of contacts 40 and 41. As is apparent a unit of this type would, in many respects, be preferred for the purpose of controlling a refrigerating or cooling apparatus. However, by, for example, employing a suitable control involving a relay it might be employed to control the functioning of heating apparatus.

When it is necessary to adjust the temperature setting which is incorporated in the thermostat so that contacts 40 and 41 remain in engagement until a lower temperature is reached, or so that these contacts do not engage until a higher temperature is reached, this is achieved by adjusting the neck portion 22. This is accomplished by the use of suitable tools or by flexing the neck portion through the retraction and projection of plugs such as 46. If the bending or adjustment of the parts results in the flexion assembly (as viewed in Fig. 1) being shifted to the left, then contacts 40—41 will separate at a higher temperature. Conversely a shifting of this assembly in a clockwise direction will cause bar 33 and the parts coupled therewith to be similarly shifted. Therefore, that bar will not cooperate with element 43 to shift contact 41 until a lower temperature is reached.

The foregoing adjustment of the parts is not at all critical. Rather, instead of a deflection of strip 23 resulting in a magnified movement of the structure carried by supporting member 26, the degree of that movement will be substantially equal from the zone of the flexion coupling through to the bar 33. The amount of movement which the flexion coupling is subjected to will correspond generally to the amount of deflection of strip 23 in the zone of its end which projects through neck 22. These movements will occur within the limits defined by the tube 20 or other enclosure. Accordingly, when the parts are adjusted in the manner aforedescribed, the flexion coupling will be shifted laterally and such shifting will be generally and substantially equal to the shift of bar 33 in a lateral direction.

In the structure of Figs. 1 to 5, a mechanism is furnished in which the contacts open or close at a relatively slow rate as the temperature varies. This results in little or no differential between opening and closing temperatures. If a positive temperature differential is desired, then a structure such as has been suggested in Figs. 6 and 7 may be employed. As will be seen, in those views there has been illustrated the upper portion of the thermostat assembly and the same reference numerals have been employed in these figures to designate similar parts to those heretofore described and shown in the earlier figures.

However, it will be observed that in Figs. 6 and 7 a magnetic structure is associated with the mechanism in the region of the contacts. Thus, an armature is interposed between contact 41 and strip 42. This armature has ben indicated by the numeral 48 and is formed of high-permeability iron. A magnet 49 is mounted upon the electrode or the lead 37 and to the rear of contact 40. The arms of this magnet extend outwardly so that contact 40 is preferably housed within the crotch of magnet 49.

The parts are conveniently so proportioned and of such value that, for substantially the last .001" of movement of the contacts 40 and 41 towards each other, the rate of increase of the magnet pull exceeds the rate of resiliency of the supporting structure of which the webs 31 form a part. Also, the amount of attraction or pull should exceed any separating tendency exerted by the spring 44 or functionally equivalent parts. Additionally, the parts should be so proportioned that a small gap will remain between the magnet 49 and its armature 48. In this manner it will be apparent that a snap action will occur such that a rapid opening or closing of the circuit will follow, when the parts have once been biased or shifted in a given direction.

In the form of structures shown in Figs. 8 and 9 the same reference numerals have again been employed to indicate the parts which have heretofore been described. In these views, however, it will be noted that the lower end of the casing 20 is constricted as at 50 to support a relatively heavy strip 51 formed of metal having a low coefficient of expansion. A strut 53 formed of similar material has its lower end secured to strip 51 and its upper end secured to the inner face of tube or casing 20 adjacent the upper end of the latter. This strut is preferably in the form of a channelled or flanged member. Intermediate its ends the flanges are notched as indicated at 54 to preferably provide a V structure, the arms of which are widely spread. In line with this notch and adjacent the points of connection of the strut with the casing 20 and strip 51, its web may be pierced as indicated at 55. So pierced three flexure points are provided. Two supporting members 56 are secured to the sides of strut 53 at a point short of the point of notching 54. Thus, in effect, they provide an extension arm of the lower portion or leg of the strut. This arm supports bar 33 attached to the end of spring 32 also secured to strut 53 and allows a movement of the bar as heretofore described in Figs. 1 to 5. Again in this structure the parts are preferably secured to each other by spot welding or in any other desired and proper manner.

Contrary to the structure described in Figs. 1 to 5 a cooling of the unit as in Figs. 8 and 9 results in contact 41 being permitted to move to the right as viewed in Fig. 8 and thus engage contact 40 to close the circuit. A warming of casing 20 by being exposed to heat causes the latter to distend axially with consequent movement of the supporting arm 56 to the left. This will result in contacts 40 and 41 separating. It will again be found that in this assembly of the parts an adjustment may be effected by simply bending the constricted lower portion 50 and the enclosed strip 51 to shift the upper end of the latter in the desired direction. Such shifting will carry with it the mounting block 52 and the lower end or leg of strut 53. If the direction of shift of mounting block 52 is in a clockwise direction as viewed in Fig. 8, then supporting arm 56 will tend to move in a counterclockwise direction. In this connection it will be understood that the side flanges of the arm assembly provided by the side webs 56 are secured by spot welding or otherwise to the side flanges of strut 53 at a point below the notch 54. Under these circumstances the temperature setting is lowered by this adjustment. As in Figs. 1 to 5, the lateral shift of bar 33 is very much less with this arrangement of the parts than would be the case if a single rigid member were employed extending from the point of juncture of strip 51 and casing 20 through to bar 33. The structure of Figs. 8 and 9 is somewhat similar to that shown in the earlier figures. However, the expanding and contracting movement of the tube or shell 20 is not amplified as much in the zones of the contacts as in the earlier structure. Nevertheless, the force of movement in the zone of the contacts is high and the assembly is extremely rigid. Therefore, it is suitable for use with heavier loads under adverse conditions of vibration.

In the event it is desired to rearrange the parts so that the contacts will engage in response to a rise in temperature instead of opening under those circumstances, a structure such as has been shown in Fig. 10 may be employed. That structure corresponds generally to the one just described in connection with Figs. 8 and 9. However, as will be seen in Fig. 10, the supporting webs 56 do not have their right hand edges engaging with the cross bar 33. Rather, this bar is mounted by a spring 57 secured to the strut 53 at a point below the V notch 54 and the spring extends tangentially between webs 56 and mounts at its upper end a bar 58. Under the influence of spring 57 that bar bears against the left hand edges of webs 56. Therefore as these webs move in a clockwise direction as viewed in Fig. 10, the bar will engage with the di-electric or spherical element 59 to cause a flexion of spring 60. Accordingly, contact 61 which is supported by spring 60 will be caused to move out of engagement with contact 62 which is mounted by electrode or lead 36. As will also be seen in this view electrode or lead 37 mounts spring 60.

In Figs. 11 to 13 the tube of casing 20 has its constricted lower portion mounting strips 63 and 64. Each of the latter has secured to it strut members 65. These members have their upper ends attached to the inner face of tube 20 and mounting blocks 66 and 67 may be secured to the lower ends of the two struts in the zone of their attachment to the strips 64. Each of the struts is preferably provided with zones of flexure by forming V notches 68 in its side flanges; the zones of the notches in the different struts being in separate planes. A supporting arm provided by spaced webs 69 is mounted within the tube in a manner hereinafter described. Transverse members 70 and 71 maintain the webs in spaced relation. A spring 72 has its lower end secured by spot welding or any other desired manner to transverse member 70. Its upper end supports bar 73 which bears against the edges of webs 69. Contacts 40 and 41 being supported as heretofore described by electrodes or leads 36 and 37, it follows that if arm 69 is rocked, bar 73 will engage the spherical element 43 to separate contacts 40 and 41.

The arm 69 is supported by the left hand strut as viewed in Fig. 11 by springs 74 and 75. Spring 74 is coupled to the lower surface of transverse member 71 and has its outer end secured to a bracket 76 which is in turn attached to the rear face of the left hand strut. Spring 75 is formed with an opening through which spring 74 passes. This spring has its lower part secured to the inner face of the left hand strut. The upper end of spring 75 is secured to the side face of transverse member 71 adjacent the rear face of the strut 65 which is under consideration.

A bracket 77 is secured to the outer face of the right hand strut 65 as in Fig. 11. The upper arm of this bracket has attached to it the outer end of a transverse spring strip 78. The inner end of that strip is secured to transverse member 71 in a plane above the plane in which the inner end of strip 74 is secured to that member. In common with strip 74, strip 78 passes through the opening formed in the strut adjacent the base of the V-shaped notch 68. Thus, transverse member 71 lies substantially in the plane of these notches and has secured to its peripheral face, the springs 74, 75 and 78. Again the securing of the parts is preferably effected by spot welding.

When shell or casing 20 is subjected to the action of heat it expands. Due to the fact that the struts 65 have a low co-efficient of expansion, it follows that the distance between the outer ends of brackets 76 and 77 will be increased. This will have the effect of moving spring strips 74 and 78 outwardly thereby rotating transverse member 71. The latter being attached to the webs providing the supporting arm 69, this arm will be rotated. Such rotation will occur in a clockwise direction. Therefore contacts 40 and 41 will remain in engagement. A cooling of the shell or casing 20 will result in a reverse action of the parts and the rotation of arm 69 in a counter-clockwise direction. As soon as bar 73 engages element 43, this will of course serve to separate contacts 40 and 41 and open the circuit.

As will be understood from a consideration of this structure the height of transverse member 71 might be said to constitute the short arm of a lever of which the long arm is virtually the full length of the supporting arm or webs 69. The lower ends of struts 65 being attached to the mounting strips 63—64 at points unequally spaced from the center, it follows that their location relative to the point defined by the zone of juncture of these mounting strips and the shell or tube 20 will not be the same. Consequently under adjustment the position of arm 69 is changed. Accordingly the temperature setting may be altered in a manner similar to that heretofore described in connection with the structures of the earlier figures.

In Figs. 14 and 15 a structure has been shown which generally corresponds to that illustrated in Fig. 8. However, in this form of device the strut 79 extends tangentially across the casing at a point above its V notch 80 and is connected to a cross bar 81 which has its ends secured to the inner face of shell or tube 20. Arm 82 embracing spaced webs is secured to the lower leg of strut 79 at a point below the notch 80. Also secured to this part of the strut is a spring 83 carrying at its upper end a cross bar 84 bearing against the outer edges of the webs furnishing arm 82. Contacts 85 and 86 are provided; the latter being supported upon an electrode or lead 87 extending through the cap of the unit. The second lead or electrode 88 also extends through this cap and has within the body of the device a gap which may be bridged by a glass bead 89. Below this gap lead 88 mounts the spring 44 which supports the spherical element 43 to be engaged by bar 84 and thus shift contact 85.

Jacketed within the sleeve is a heating element embracing a coil 90 and sleeve 91. One end of this coil is connected with lead 88 in advance of bead 89 or its equivalent. The opposite end of the coil is connected with lead 88 at a point beyond the gap which is formed in the same.

When electrodes or leads 87 and 88 are connected to a source of electrical power and its contacts 85 and 86 are in engagement, current will flow through coil 90. Consequently shell or tube 20 and the surrounding medium will be heated. Under these circumstances, the tube will increase in axial length. Strip 51 and strut 79 having their outer ends anchored against movement with respect to the shell or tube casing in a manner similar to that shown in Fig. 8, it follows that manual adjustment of the response range of the mechanism may be resorted to as heretofore described in the earlier figure. When the temperature has risen to a point where the contacts separate, the flow of current through coil 90 is interrupted and further temperature rise is prevented. The medium surrounding the unit may embrace a material having high thermal conductivity. It may be a metal block in which the shell or tube fits snugly without being restrained from expanding and contracting in longitudinal directions. Under these circumstances the temperature of the shell or tube will be constantly the same as that of the surrounding metal. The tube or shell being the temperature-responsive element of the thermostat as well as the only heat-transfer link between the heating element and the surrounding medium, the coupling is such that the response is very rapid and the temperature differential very small. As is apparent, when the tube has cooled to an adequate extent, contacts 85 and 86 will again engage. When this occurs the heating element of the thermostat will again be energized as aforedescribed to thus provide controlled heating of the surrounding medium.

Finally referring to Figs. 16, 17 and 18 there has been shown a form of mounting for thermostats of the type herein embraced and which mounting will serve to admit of a ready adjustment of the parts when this is necessary. Also it will serve to properly support the mechanism under all circumstances. To this end a unit such as has been shown in Figs. 1 to 5, may be employed and disposed adjacent a base 93 preferably formed with side flanges 94. Straps 95 and 96 may extend outwardly from this base and be secured thereto by, for example, spot welding. The reduced end portion 22 of unit is disposed adjacent strap 95. To provide a clamping structure at this point bolts 96 may extend through this strap one to each side of bar 22. These bolts also extend through a bar 97 which engages the rear face of constricted portion 22 and is in turn engaged by nuts 98. Thus, it is obvious that the reduced end of tube 20 may be firmly supported and restrained from moving.

Adjacent the opposite end of base 93 a spring 99 may be furnished which bears against the rear of tube 20 and urges the same outwardly towards the inner face of strap 96. This part of the strap mounts a nut 100 through which a bolt or set screw 101 extends. The latter also extends through an opening in the strap 96 so that it may bear against the outer face of tube 20. The leads 36 and 37 of the latter are connected to prongs 102 which extend through openings in base 93 and are supported by a mounting block 103 of di-electric material.

As is apparent, with a unit supported in this manner its upper end is—as afore brought out—restrained from moving. Its lower end is capable of swinging movements. An operator desiring to adjust the parts will simply rotate the screw 100 in clockwise or counterclockwise direction. According to the direction of such rotation the lower end of the unit as viewed in Fig. 16 will be forced towards base 93 or else urged in the direction of the inner face of the outer strap portion 96. Therefore, a manual adjustment of the parts will occur as heretofore described in connection with Figs. 1 to 5.

As will be understood, the teachings of the "reversed" structure shown in Fig. 10 could be incorporated in the several other forms, and excepting only that illustrated in Figs. 14 and 15. Also, while in many respects it is desired to completely enclose the several contacts and mounting operating structures thereof in a tube, the latter might have openings or fail to provide an enclosure for these contacts and associated parts. Therefore, except where otherwise defined by the claims, the term "shell" is to be construed as a mounting member having a different co-efficient of expansion than that of the several arms, strips, etc. and regardless of whether an enclosure is provided or not.

Thus, among others, the several objects of the invention as specifically aforenoted are achieved. Obviously numerous changes in construction and rearrangement of the parts might be resorted to without departing from the spirit of the invention as defined by the claims.

I claim:

1. A thermostat including in combination a shell formed of metal having a high co-efficient of expansion, a strut element having one of its ends fixed against movement with respect to said shell, a strip element also having one of its ends fixed against movement with respect to said shell at a point spaced from that at which said strut element is so fixed, at least one of said elements being formed of metal having a low co-efficient of expansion, a contact supported by said shell, a second contact movable with respect to said first named contact and cooperable therewith, an actuating arm for said movable contact carried by said strut element at a point intermediate the length of the latter and said strut element being provided with a zone of flexure at a point adjacent the point of mounting of said arm.

2. A thermostat including in combination a shell formed of metal having a high co-efficient of expansion, a strut element having one of its ends fixed against movement with respect to said shell, a strip element also having one of its ends fixed against movement with respect to said shell at a point spaced from that at which said strut element is so fixed, at least one of said elements being formed of metal having a low co-efficient of expansion, a contact supported by said shell, a second contact movable with respect to said first named contact and cooperable therewith, an actuating arm for said movable contact carried by said strut element at a point intermediate the length of the latter and said strut being formed with a notch and an opening adjacent the point of support of said arm to furnish a zone of flexion within said arm.

3. A thermostat including in combination a shell formed of material having a high co-efficient of expansion, a pair of struts having their opposite ends connected to said shell, said struts having a low co-efficient of expansion, a contact carried by said casing, a cooperating contact movably supported adjacent said first named contact, a rockable actuating arm movable with respect to said latter contact for shifting the same, means defining a pivot for said arm and means connecting said struts to said pivot-defining means for rocking the latter and said arm.

4. A thermostat including in combination a shell formed of metal having a relatively high co-efficient of expansion, an assembly including at least one part having a relatively low co-efficient of expansion, said assembly being connected to said shell to have portions moved with respect to said shell as the latter distends and shrinks in response to temperature changes, electrical leads extending into said shell, a pair of contacts connected one to each of said leads, a spring interposed in at least one of the connections between one contact and its lead, a further spring carried by one of the moveable portions of said assembly, said further spring having greater resistance to flexion than said interposed spring and said further spring acting against the interposed spring to effect relative movements of said contacts.

5. A thermostat including in combination a supporting member, a switch carried by said member, a strip attached to said member adjacent one of its ends, a second strip attached to said member at a point remote from said first-named strip, said strips having a co-efficient of expansion different from that of said member, a coupling structure connected to the unattached ends of said strips to be rocked thereby as said latter ends move with respect to each other and said member in response to changes in temperature, movement-magnifying means connecting said coupling structure with said switch to operate the latter as said structure rocks, said coupling structure being disposed adjacent that end of said supporting member to which said first-named strip is attached and at least the latter end of said supporting member being flexible whereby the adjacent strip, coupling structure and switch-operating means will be laterally deflected for a distance substantially equal to the amount of deflection of the end of said supporting means with respect to its body.

6. A thermostat including in combination a supporting member, a switch carried by said member, a strip attached to said member adjacent one of its ends, a second strip attached to said member at a point remote from said first-named strip, said strips having a co-efficient of expansion different from that of said member, a coupling structure connected to the unattached ends of said strips to be rocked thereby as said latter ends move with respect to each other and said member in response to changes in temperature, movement-magnifying means connecting said coupling structure with said switch to operate the latter as said structure rocks, said coupling structure being disposed adjacent that end of said supporting member to which said first-named strip is attached, at least the latter end of said supporting member being flexible whereby the adjacent strip, coupling structure and switch-operating means will be laterally deflected for a distance substantially equal to the amount of deflection of the end of said supporting means with respect to its body and means bearing against said supporting member and shiftable in a direction substantially perpendicular to its axis for causing such flexing.

7. A thermostat including in combination a supporting member, a switch carried by said member, a strip attached to said member adjacent one of its ends, a second strip attached to said member at a point remote from said first-named strip, said strips having a co-efficient of expansion different from that of said member, a coupling structure connected to the unattached ends of said strips to be rocked thereby as said latter ends move with respect to each other and said member in response to changes in temperature, movement-magnifying means connecting said coupling structure with said switch to operate the latter as said structure rocks, said coupling structure being disposed adjacent that end of said supporting member to which said first-named strip is attached, at least the latter end of said supporting member being flexible whereby the adjacent strip, coupling structure and switch-operating means will be laterally deflected for a distance substantially equal to the amount of deflection of the end of said supporting member with respect to its body, mounting means for the latter end of said supporting member and adapted to retain the latter substantially against movement and means associated with said mounting means and bearing against said supporting member at a point substantially remote from its flexible end to move in a direction substantially perpendicular to the axis of said supporting member for causing such flexing.

8. A thermostat including in combination a shell formed of metal having a relatively high co-efficient of thermal expansion, at least a part of said shell being formed of material susceptible to deformation, an assembly including at least one part having a relatively low co-efficient of expansion, said assembly being connected to said shell adjacent said deformable part and at a point spaced therefrom to have portions moved along a predetermined path of travel at a highly amplified rate with respect to said shell in proportion to and in response to its longitudinal expansion and contraction resulting from temperature changes, said portions being also disposed to be moved along the same path at a lesser amplified rate with respect to the shell by reversible lateral deformation of said part of the shell.

9. A thermostat including in combination a shell formed of metal having a bendable restricted end portion and formed of a metal embracing a relatively high co-efficient of thermal expansion, a rigid element held by the restricted end portion of said shell and extending into the unrestricted portion of said shell, an assembly including at least one part with a relatively low co-efficient of expansion, said assembly being flexibly attached to the inside end of said rigid element and also to the inside of the shell near its opposite end, a contact supported by said shell, a second contact movable with respect to said first-named contact and cooperable therewith, an actuating arm for said movable contact forming part of said assembly, said assembly being constructed so that the longitudinal expansion and contraction of the shell resulting from temperature changes cause a substantially amplified movement at the end of the actuating arm, and also constructed so that mechanical bending of the restricted end portion of said shell will cause a relatively less amplified movement at the end of the actuating arm along the same path.

10. A thermostat including in combination an elongated member, a strut member having both ends fixed against movement with respect to said elongated member, one of said members being made of a metal having a relatively high co-efficient of thermal expansion, the other having a relatively low expansion co-efficient, a contact supported in fixed relation to said elongated member, a second contact movable with respect to said first-named contact and cooperable therewith, an actuating arm for said movable contact carried by said strut member at a point intermediate the length of the latter and said strut element being provided with a zone of flexure at a point adjacent the point of mounting of said arm.

11. A thermostat including in combination a supporting member, a strip connected to said member adjacent one end of the same, a strut having one of its ends connected to said member at a point remote from that at which said strip is connected thereto, a pair of contacts supported by said member, an element having an outer end cooperative with one of said contacts to cause the same to move relatively to the other, said strip and strut being formed of a material having a different co-efficient of expansion than said member and a coupling structure connecting adjacent ends of said strip, strut and element to each other whereby minute movements of the adjacent strut and strip ends with respect to each other will cause the coupling structure to rock and the outer end of said element to move through a relatively large path and cooperate with said one contact.

12. A thermostat including in combination a supporting member, a strip connected to said member adjacent one end of the same, a strut having one of its ends connected to said member at a point remote from that at which said strip is connected thereto, a pair of contacts supported by said member, an element having an outer end cooperative with one of said contacts to cause the same to move relatively to the other, said strip and strut being formed of a material having a different co-efficient of expansion than said member, a coupling structure connecting adjacent ends of said strip, strut and element to each other whereby minute movements of the adjacent strut and strip ends with respect to each other will cause the coupling structure to rock and the outer end of said element to move through a relatively large path and cooperate with said one contact, said coupling structure being disposed adjacent that end of the supporting member to which the strip is connected and such end of said member being formed of flexible material whereby it may be deflected in a direction substantially perpendicular to the axis of said supporting member to laterally shift said strip, coupling structure and element with respect to the axis of the same.

13. A thermostat including in combination a supporting member, a contact carried thereby, a spring also carried by said supporting member, a second contact cooperative with said first contact and mounted by said spring, an actuating assembly connected to said supporting member and having a co-efficient of expansion different than than of the latter, means forming a part of said assembly and supported for rocking movement as temperature variations cause expansion and contraction of the parts and a second spring more powerful than the first-named spring, said second spring extending from said assembly to be swung thereby to act against the thrust exerted by said first spring and to cause relative movements of said contacts.

14. A thermostat including in combination a side wall providing a supporting member, a strip having an end secured against movement with respect to said side wall, a strut having one end also connected to said side wall at a point spaced from the point of connection of the strip therewith, said strip and strut being formed of a material having a different co-efficient of expansion than the material of said supporting member, a coupling structure connected to the opposite ends of said strut and strip and supported for rocking movements in response to expansion and retraction of the parts, a switch-operating element connected to said wall and extending therefrom and means projecting from said structure to be swung thereby into engagement with said operating element to cause a functioning of a switch connected therewith.

15. A thermostat including in combination an elongated member, a switch carried by said member, a strut element having one of its ends fixed against movement with respect to said elongated member, a strip element attached to said elongated member at a point remote from that at which said strut element is so fixed, said strut element having a co-efficient of expansion different from that of said elongated member, a flexible connection between an end of said strut element and one end of said strip element, an actuating arm carried by said strut element at a point intermediate the length of the latter for operating said switch in response to changes in temperature, said strut element being provided with a zone of flexure at a point adjacent the point of mounting of said arm, and said elongated member being flexible at a point adjacent to the point of attachment of said strip element, whereby that end of said strip element which is flexibly connected to said strut element can be moved in a direction substantially perpendicular to the axis of said elongated member, thereby changing the temperature at which said arm will operate said switch.

16. A thermostat including in combination a supporting member, a switch carried by said member, a strip attached to said member adjacent one of its ends, a second strip attached to said member at a point remote from said first-named strip, said strips having a co-efficient of expansion different from that of said member, a coupling structure connected to the unattached ends of said strips to be rocked thereby as said latter ends move with respect to each other and said member in response to changes in temperature, movement-magnifying means connecting said coupling structure with said switch to operate the latter as said structure rocks, said coupling structure being disposed adjacent that end of said supporting member to which said first-named strip is attached, at least the latter end of said supporting member being flexible whereby the adjacent strip, coupling structure and switch-operating means will be laterally deflected for a distance substantially equal to the amount of deflection of the end of said supporting means with respect to its body, clamping means for the latter end of said supporting member, and means associated with said clamping means and bearing against said supporting member at a point substantially remote from its flexible end to cause flexing of this end in a direction substantially perpendicular to the axis of said supporting member.

WILLIAM C. BROEKHUYSEN.

References Cited in the file of this patent
UNITED STATES PATENTS

| Number | Name | Date |
|---|---|---|
| 1,378,730 | Shoenberg | May 17, 1921 |
| 1,827,102 | Penn | Oct. 13, 1931 |
| 1,933,083 | Ackerman | Oct. 31, 1933 |
| 1,942,002 | Romanelli | Jan. 2, 1934 |
| 1,976,954 | Mantz | Oct. 16, 1934 |
| 1,992,765 | Petersen | Feb. 26, 1935 |
| 2,244,915 | Marvin | June 10, 1941 |
| 2,402,240 | Crise | June 18, 1946 |
| 2,441,725 | Smith | May 18, 1948 |
| 2,516,502 | Altman et al. | July 25, 1950 |